United States Patent [19]

Livesay

[11] 4,039,305

[45] Aug. 2, 1977

[54] APPARATUS FOR REMOVING GAS FROM A LIQUID SYSTEM

[75] Inventor: Richard E. Livesay, Peoria, Ill.

[73] Assignee: Caterpillar Tractor Co., Peoria, Ill.

[21] Appl. No.: 742,964

[22] Filed: Nov. 17, 1976

[51] Int. Cl.² .............................................. B01D 19/00
[52] U.S. Cl. .................................... 55/159; 210/172; 210/436; 210/472
[58] Field of Search ........................... 55/36, 46, 159; 216/137, 172, 436, 472

[56] References Cited

U.S. PATENT DOCUMENTS

| 3,273,313 | 9/1966 | Livesey et al. | 55/46 |
| 3,523,408 | 8/1970 | Rosenberg | 55/159 |
| 3,979,292 | 9/1976 | Kuhn | 210/436 |

Primary Examiner—Frank A. Spear, Jr.
Assistant Examiner—Richard W. Burks
Attorney, Agent, or Firm—Frank L. Hart

[57] ABSTRACT

Apparatus is connected in the liquid system for separating gas from the liquid, for example. The gas laden oil is directed into a filter positioned within a housing. The filter is of a material sufficient for separating gas bubbles from the oil while passing the oil therethrough. The separated gas passes upwardly and through a gas outlet opening out the top portion of the housing. Degassed oil passes through the filter and from the housing at a location adjacent a bottom end of the housing.

8 Claims, 2 Drawing Figures

APPARATUS FOR REMOVING GAS FROM A LIQUID SYSTEM

BACKGROUND OF THE INVENTION

For efficient operation of the hydraulic system of a work vehicle, for example an excavator, it is necessary to maintain the amount of gas in the hydraulic oil at a preselected low value. In some hydraulic systems, gas sometimes becomes entrained in the hydraulic oil. Heretofore, utilized methods of removing this entrained gas have not been of desired efficiency or are undesirably expensive and/or complicated to service.

The present invention is directed to overcoming one or more of the problems as set forth above.

According to the present invention, a liquid system has a liquid flow path having spaced predetermined inlet and outlet means for conducting liquid through the liquid system. A filter means is disposed in said flow path for passing liquid through the filter and separating gas from the liquid. A vent means is provided for removing the separated gas from the system.

DETAILED DESCRIPTION OF THE INVENTION

Figure 1:
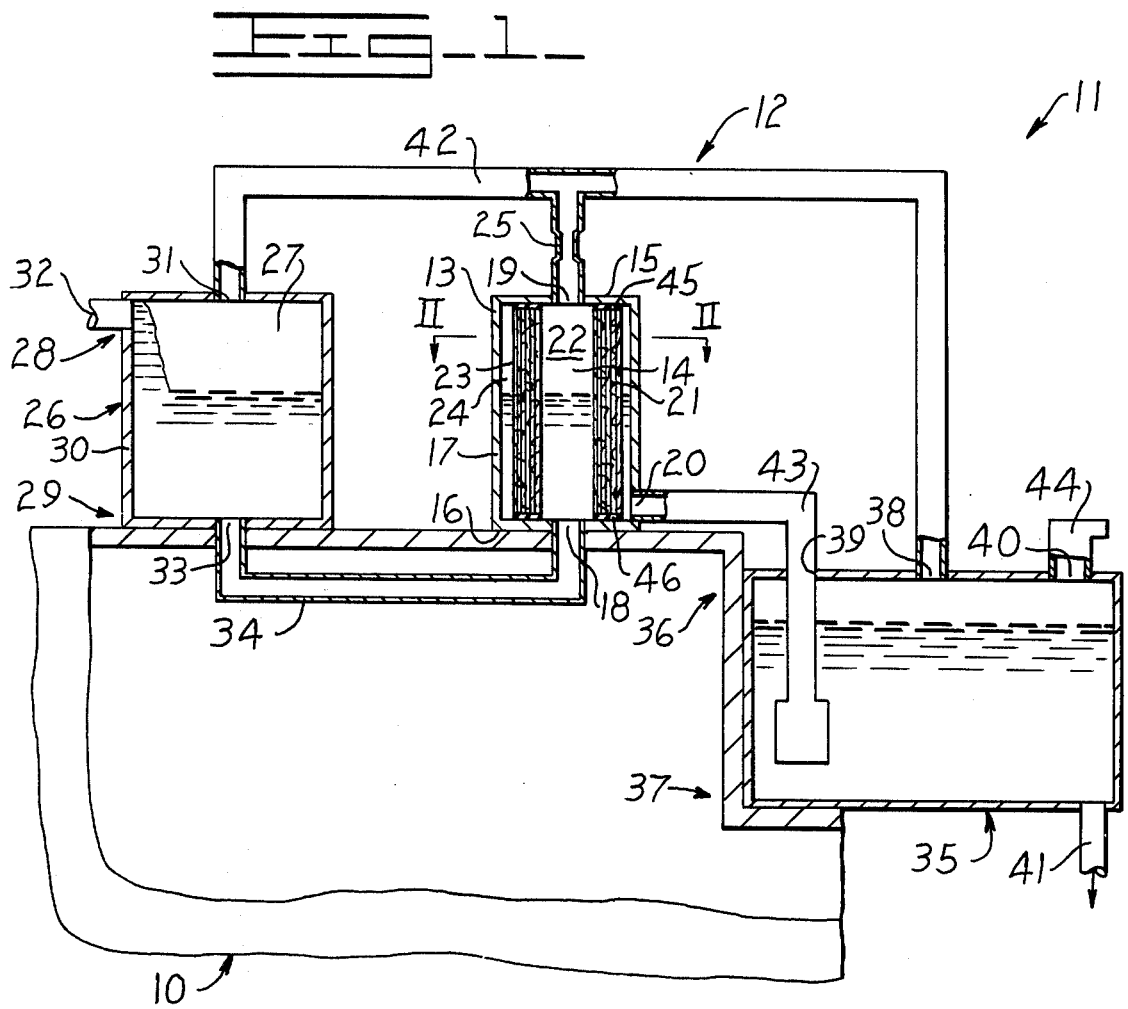
FIG. 1 is a diagrammatic frontal view of a portion of a hydraulic system of a work vehicle, said system having the apparatus of this invention.

Referring to FIG. 1, a work vehicle 10, for example an excavator, has a hydraulic system 11 serving work elements (not shown) of the vehicle 10. The apparatus 12 of this invention is positioned in the hydraulic system 11 for separating entrained gas from the hydraulic oil.

A housing 13 is provided which has a chamber 14, top and bottom ends 15,16, sidewalls 17, an inlet opening 18 on the bottom end 16, a gas outlet opening 19 on the top end 15, and an oil outlet opening 20 on the sidewall 17 at a location adjacent the bottom end 16.

A filter element 21 is positionable in the chamber 14 of the housing 13. The filter element 21 has a central opening 22 extending therethrough and sidewalls 23.

Figure 2:
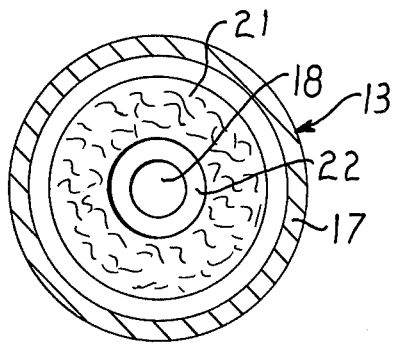
FIG. 2 is a diagrammatic sectional view of the housing and filter taken along line II—II of FIG. 1.

Referring to FIGS. 1 and 2, the filter element 21 is of a construction sufficient for encompassing the inlet opening 18 and the gas outlet opening 19 of the housing 13 and extends therebetween. The outer diameter of the filter 21 is of a size sufficient relative to the housing 13 for forming an annulus 24 between the filter 21 and the housing sidewalls 17.

The filter 21 is formed of a material sufficient for separating gas bubbles having a diameter of at least 0.005 inches or greater from hydraulic oil during passage of hydraulic oil through the sidewalls 23. Materials from which the filter can be constructed are, for example, metal mesh, paper elements, or fibrous materials with 10 – 15 micron openings (minimum).

A restricting element 25 can be positioned in the gas outlet opening 19 of the housing 13 for controlling the tendency for oil to be discharged through the opening 19.

A tank 26 can also be positioned in the hydraulic system 11 at a location upstream of the housing 13 for protecting the housing 13 against volume surges of the hydraulic oil and for separating a first portion of gas from the incoming hydraulic oil. The tank 26 has a chamber 27, top and bottom end portions 28,29, and sidewalls 30. The top end portion 28 has a gas outlet opening 31 and an inlet opening 32. A bottom oil-gas outlet opening 33 is on the bottom end portion 29 of the tank 26.

First means 34, for example a conduit, is provided for connecting the oil-gas outlet opening 33 of the tank 26 to the inlet opening 18 of the housing 13.

A hydraulic oil reservoir 35 is provided for holding hydraulic oil for subsequent delivery to the pumps (not shown). The reservoir 35 has a top portion 36, bottom portion 37, first, second, and third openings 38,39,40 in the top portion 36, and an oil outlet opening 41 preferably in the bottom portion 37 of the reservoir 35.

Second means 42, for example conduit, connect the gas outlet openings 31,19 of the respective tank 26 and housing 13 in fluid communication with the first opening 38 of the reservoir 35. By this construction, oil carried into the gas vent conduits by severe pressure or volume surges are recovered in the reservoir 35.

Third means 43, for example conduit, is connected to the oil outlet opening 20 of the housing 13 and extends through the second opening 39 of the reservoir 35 and through the reservoir to the bottom portion 37 of the reservoir 35.

Fourth means 44, for example a breather cap, is associated with the third opening 40 of the reservoir 35 for venting gas from the reservoir 35.

Sealing means 45,46 can each be positioned between respective ends of the filter element 21 and the housing 13 for preventing gas and/or oil from flowing between the housing 13 and the ends of the filter element 21. The sealing means 45,46 can be formed from any suitable stationary sealing material such as O-rings or gaskets, for example.

In the operation of the apparatus of FIG. 1, a first volume of gas is separated in the tank 26 and passes into the top portion 36 of the reservoir 35 via the second means 42. Resultant oil with entrained gas passes from the tank 26 into the central opening 22 of the filter element 21 via the first means. The head of fluid in the central opening 22 of the filter 21 forces oil through the filter 21 into the annulus 24. As the hydraulic oil passes through the filter element 21, entrained gas having a bubble diameter of 0.005 inches or greater is prevented from passing through the filter and is maintained in the central opening 22 of the filter 21 into the top portion 36 of the reservoir where it thereafter is removed from the hydraulic system 11 through the third opening 40 of the reservoir 35. The degassed hydraulic oil passes from the annulus 24 into a bottom portion 37 of the reservoir via the third means 43.

By so separating the gas and positioning it in the top portion of the reservoir for subsequent removal, loss of hydraulic oil is avoided during pressure surging of the hydraulic system. By below liquid level injection of the degassed oil in the reservoir, further regassifying of the oil is avoided. By the construction of the filter and housing, the apparatus is simple, most efficient, and uses little construction material thereby adding little weight to the vehicle.

Other aspects, objects, and advantages of this invention may be obtained from a study of the disclosure, the drawings, and the appended claims.

The embodiments of the invention in which an exclusive property or privilege is claimed are defined as follows:

1. Apparatus for removing entrained relatively lighter gas from a liquid in a liquid system, comprising:
    a liquid flow path having spaced predetermined inlet and outlet means for conducting liquid through the apparatus;
    filter means disposed in said flow path between said inlet and outlet means for passing liquid through said filter means and resisting the passage of gas therethrough for separating the gas from the liquid;
    vent means disposed upstream of said filter means and at an elevationally higher point in said flow path than said inlet means for separating the relatively lighter gas from said liquid flow path; and
    means associated with the lower end of said filter means and the lower end of a reservoir of said liquid system for passing liquid from said filter means into the lower end of said reservoir.

2. Apparatus, as set forth in claim 1, including:
    restricting means for controllably removing gas separated by said filter means.

3. Apparatus, as set forth in claim 1, wherein the filter means comprises:
    a housing having a chamber; and
    a filter element having a central opening and being formed of one of metal mesh, paper element, and fibrous material.

4. Apparatus for removing air from hydraulic oil in a hydraulic system of a work vehicle, comprising:
    a housing having a chamber, top and bottom ends, sidewalls, an inlet opening on the bottom end, a gas outlet opening on the top end, and an oil outlet opening adjacent the bottom end;
    a filter element having a central opening and sidewalls, said filter element being of an outside diameter sufficient for forming an annulus between the filter element and the housing sidewalls in the installed position with the housing chamber, and being of a material sufficient for separating gas bubbles from hydraulic oil during passage of hydraulic oil through the filter sidewalls.

5. Apparatus, as set forth in claim 4, including:
    a restricting element positioned in the gas outlet opening of the housing.

6. Apparatus, as set forth in claim 4, including:
    a tank having a chamber, top and bottom end portions, sidewalls, an inlet opening on the top end portion, a gas outlet opening on the top end portion, and an oil-gas outlet opening on the bottom end portion; and
    first means for connecting the oil-gas outlet opening to the inlet opening of the housing.

7. Apparatus as set forth in claim 4, including:
    a hydraulic oil reservoir having a top portion, a bottom portion, first, second, and third openings in the top portion, and an oil outlet;
    second means for communicating the gas outlet openings of the tank and housing to the first opening of the reservoir; and
    third means for passing hydraulic oil from the oil outlet of the housing, through the second opening of the reservoir and into the bottom portion of the reservoir.

8. Apparatus, as set forth in claim 7, including:
    fourth means, associated with the third opening of the reservoir, for venting gas from the reservoir.

* * * * *